(12) United States Patent
Upreti et al.

(10) Patent No.: US 8,247,013 B2
(45) Date of Patent: *Aug. 21, 2012

(54) METHOD FOR PRODUCING FROZEN DOUGH

(75) Inventors: Praveen Upreti, Orchard Park, NY (US); Rohit Jalali, Ridgeway (CA); Melissa Haller, Orchard Park, NY (US); Nikolay Shkolnik, W. Hartford, CT (US); Pavel Yurievich Koblents, St. Petersburg (RU); Dmitry Ivanovich Pivunov, St. Petersburg (RU)

(73) Assignee: Rich Products Corporation, Buffalo, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/172,275

(22) Filed: Jun. 29, 2011

(65) Prior Publication Data

US 2011/0256263 A1  Oct. 20, 2011

Related U.S. Application Data

(63) Continuation of application No. 11/641,300, filed on Dec. 18, 2006, now Pat. No. 7,972,642.

(60) Provisional application No. 60/753,518, filed on Dec. 23, 2005.

(51) Int. Cl.
*A21D 2/00* (2006.01)

(52) U.S. Cl. ......... 426/498; 426/496; 426/312; 426/18; 426/62; 426/549

(58) Field of Classification Search ....................... None
See application file for complete search history.

(56) References Cited

U.S. PATENT DOCUMENTS

| 691,749 | A |   | 1/1902  | Corbey et al. |
|---------|---|---|---------|---------------|
| 2,953,460 | A | * | 9/1960 | Baker ............... 426/19 |
| 3,031,980 | A |   | 5/1962  | Bonomo et al. |
| 3,111,059 | A |   | 11/1963 | Marsh |
| 3,424,590 | A |   | 1/1969  | Booras |
| 4,369,193 | A |   | 1/1983  | Collins et al. |
| 4,406,911 | A |   | 9/1983  | Larson et al. |
| 4,743,452 | A |   | 5/1988  | Felske et al. |
| 4,847,104 | A |   | 7/1989  | Benjamin et al. |
| 5,030,466 | A |   | 7/1991  | Kageyama et al. |

(Continued)

FOREIGN PATENT DOCUMENTS

DE  19643712 A1  4/1998

(Continued)

OTHER PUBLICATIONS

Gandikota et al.; Expansion capacity of doughs: methodology and applications; Journal of Cereal Science, Feb. 2005, vol. 42; pp. 157-163.

(Continued)

*Primary Examiner* — Humera Sheikh
*Assistant Examiner* — Felicia King
(74) *Attorney, Agent, or Firm* — Hodgson Russ LLP

(57) ABSTRACT

The present invention provides a method for producing frozen dough which can be directly transferred from freezer to oven without a proofing or thawing step. The process comprises mixing the dough ingredients, forming gas nucleation sites, exercising the dough by subjecting to cycles of pressure differentials and freezing the dough. The frozen product can be transferred directly from the freezer to an oven for baking.

18 Claims, 2 Drawing Sheets

U.S. PATENT DOCUMENTS

| | | |
|---|---|---|
| 5,458,902 A | 10/1995 | Rudel |
| 5,560,946 A | 10/1996 | Sanders et al. |
| 6,025,001 A | 2/2000 | Nonaka et al. |
| 6,399,120 B1 | 6/2002 | Kambe et al. |
| 6,419,965 B1 | 7/2002 | Douaire et al. |
| 6,579,554 B2 | 6/2003 | Moder et al. |
| 6,589,583 B1 | 7/2003 | Hansen et al. |
| 6,660,311 B2 | 12/2003 | Goedeken et al. |
| 6,884,443 B2 | 4/2005 | Domingues et al. |
| 2001/0043978 A1 | 11/2001 | Moder et al. |
| 2002/0106432 A1 | 8/2002 | Yamagata et al. |
| 2003/0049358 A1 | 3/2003 | Domingues |
| 2003/0064138 A1 | 4/2003 | Lonergan et al. |
| 2003/0104100 A1 | 6/2003 | Goedeken et al. |
| 2003/0152667 A1 | 8/2003 | Goedeken et al. |
| 2003/0157222 A1 | 8/2003 | Henry et al. |
| 2003/0165605 A1 | 9/2003 | Brown et al. |
| 2004/0076722 A1 | 4/2004 | Archibald et al. |
| 2004/0156968 A1 | 8/2004 | Fisson et al. |
| 2005/0202126 A1 | 9/2005 | Zhang et al. |
| 2007/0160709 A1 | 7/2007 | Upreti et al. |

FOREIGN PATENT DOCUMENTS

| | | |
|---|---|---|
| EP | 0326404 A2 | 8/1980 |
| EP | 0353036 A1 | 1/1990 |
| EP | 0749690 A1 | 12/1996 |
| ES | 2144247 T3 | 6/2000 |
| FR | 2733669 A1 | 11/1996 |
| GB | 2264623 A | 9/1993 |
| WO | 98/30105 A2 | 7/1998 |
| WO | 03/024233 A1 | 3/2003 |
| WO | 03/067992 A1 | 8/2003 |

OTHER PUBLICATIONS

The American Heritage Dictionary New College Edition; 1976; p. 1186.

\* cited by examiner

METHOD FOR PRODUCING FROZEN DOUGH

CROSS REFERENCE TO RELATED APPLICATIONS

This application is a continuation of U.S. patent application Ser. No. 11/641,300, filed on Dec. 18, 2006, now U.S. Pat. No. 7,972,642 which in turn claims priority to U.S. Provisional application No. 60/753,518, filed on Dec. 23, 2005, the disclosures of which are incorporated herein by reference.

FIELD OF THE INVENTION

The present invention relates generally to frozen dough and more particularly provides a method for producing frozen dough which can be transferred directly from the freezer to an oven for baking. The frozen dough product can be baked in a regular oven or in a combination oven that utilizes a combination of modalities such as convection, microwave, infrared and the like in the presence or absence of mechanical stretching during baking.

BACKGROUND OF THE INVENTION

The traditional process of baking includes mixing of ingredients, kneading of dough, dividing the dough into smaller portions, shaping and molding of dough pieces, proofing it to a particular volume, and baking. This process is cumbersome, time-consuming, and requires appropriate equipments and qualified bakers for manufacturing bread of organoleptic characteristics that are typical of freshly-baked bread. In order to minimize time and problems related to bread-baking, fully or par-baked breads were introduced. However, such products lack the characteristics of freshly-baked bread. In order to minimize preparation time and still provide freshly-baked bread, frozen doughs gained popularity in food-service, in-store bakeries, as well as home-baking.

Based on the method of production, frozen doughs are available in different forms, viz. pre-proofed or un-proofed frozen dough with or without the use of chemical leavening agents. A pre-proofed frozen dough system includes proofing of dough before it is frozen (U.S. Pat. No. 6,660,311). Such products are susceptible to damage during shipping and handling, and hence are lesser popular as compared to their un-proofed counterparts. In the un-proofed frozen dough system, the dough is separated into dough pieces and then frozen. The obtained frozen dough has a longer shelf life (~100 days or more at 0-5° F.), and is shipped in its frozen state to the food-service and in-store bakeries.

In a typical baking operation that utilizes frozen dough products, the frozen products are placed in a retarder or refrigerator (~4 to 6° C.) for two to sixteen hours for thawing, and then for an additional one to two hours for proofing, followed by baking. This can be wasteful, because the bakeries have to presume the amount of product they might need for sale at least 3 hours before baking. In addition, qualified bakers are still needed to identify the time at which proofing should be stopped and baking should be commenced. Essentially, in order to use frozen dough products, a bakery operation would need to invest in equipments (such as Freezer, Retarder, Proofer, and oven), and still have a qualified baker on the floor. Ironically, frozen dough systems are an expensive proposition as compared to the bread making that includes mixing of ingredients, and kneading of dough; but still an attractive proposition because of its convenience and cleanliness.

Hence, to address the issues of reducing cost of baking bread to customers and still providing frozen dough products with their freshly-baked quality, frozen dough manufacturers have been trying to develop a product that can preferably be transferred directly from the freezer to the oven. Certain approaches to obtain such freezer-to-oven products include use of lamination and/or chemical leavening systems (U.S. Pat. No. 6,579,554; U.S. Pat. No. 6,589,583). While lamination and chemical leaveners provide acceptable croissant or cookie-type products, they do not provide a bread-like product with flavor and crumb structure that is typical of bread. Another approach for reducing the cost of baking is by reducing time at each step or elimination of a step in the process when a frozen product is thawed in a retarder, proofed in a proofer, and then baked in an oven. In one frozen dough system, the frozen dough does not require a conventional proofing (or proofer) step prior to baking. The frozen dough is thawed in a retarder at 33 to 42° F. for at least 12 hours, or at an elevated temperature of 43 to 85° F. for at least 1 hour, and then baked to give a product with good organoleptic quality and a specific volume of at least 4 cc/g (US 2005/0202126). While research so-far has been conducted to recognize the essential compositional attributes that are desired for freezer-to-oven bread or bread-like products (U.S. Pat. No. 6,884,443), the processing and exact ingredient balance in the formulation to produce such products is not known so far.

Davis (1973) patented a method for preparing storage-stable bakery products within hermetically sealed containers that were capable of being cooked in the sealed container (U.S. Pat. No. 3,718,483). Application JP 2000-287607 describes a method for preparation of frozen dough where fermentation was carried out in a low vacuum state, and dough was further kneaded under pressure. The final product was less susceptible to generation of a "pear-like" skin, and improved the texture of the bread. U.S. Pat. No. 6,025,001 describes a process in which pre-shaped, unfrozen dough was expanded in size and baked under reduced pressure. Because of the said processes of thawing and proofing of frozen dough at reduced pressure, the overall time of bread baking at the bakery is not reduced, and the product cannot be considered a freezer-to-oven product.

SUMMARY OF THE INVENTION

All percentages included in this specification and claims represent weight percentages based on the flour weight unless indicated otherwise.

The present invention describes the processing conditions, where bread made from a dough was exposed to pressure differential prior to freezing, to produce a product that can be baked directly from the freezer to the oven to give a product with good quality and a baked specific volume of at least 4.0 cc/g.

This invention provides a method for producing frozen dough which can be directly transferred from the freezer to an oven. The dough comprises flour, fat, water, leavening agent or agents, emulsifiers and stabilizers. In one embodiment, the leavening agent is yeast. The yeast may be present up to 3 times the traditional amount of one or more yeasts with activity in the temperature range of 33-140° F. The yeast is present in an amount from 7-14%. In one embodiment, the yeast content is 8-12%. In another embodiment, the yeast content is 11%. The gluten content of the dough should be in the range of from 10 to 20% (w/w) of the flour, with higher gluten levels generally giving a dough with better gas-holding ability. Typically, flour sold as "high gluten" generally contains about 12.5 to 15% gluten. However, it is to be understood that gluten levels can fluctuate from product to product or season to season. If desired, high-gluten flour can be used as the only flour in the dough, or it can be used with other flours.

The method of preparing the dough comprises introducing "gas nucleation sites" in the dough, followed by exercising the dough. While not intending to be bound by any particular theory, it is considered that exercising the dough affects the gas nucleation sites and results in restructuring of the dough matrix. In one embodiment, the dough matrix is stretched along one axis and allowed to relax in the same axis to create a dough matrix that can be baked without any pre-baking, thawing, proofing and other treatment, to obtain a baked product with good flavor, uniform crumb, consistent crust formation, and a baked specific volume of at least 4.0 cc/g. The dough of the present invention can be conveniently used in bakeries and restaurants.

The frozen dough of the present invention advantageously can be baked in a conventional oven, such as a convection-rack oven. Because of this, the product can be conveniently used in bakeries, restaurants and the like where there is a need for quick baking of the product using routine equipment. The frozen dough of the present invention can also be baked in an oven which provides a combination of one or more modes of heating such as direct fire, heated oil, forced air, convection, microwave and/or infrared.

DETAILED DESCRIPTION OF THE INVENTION

Figure 1A:
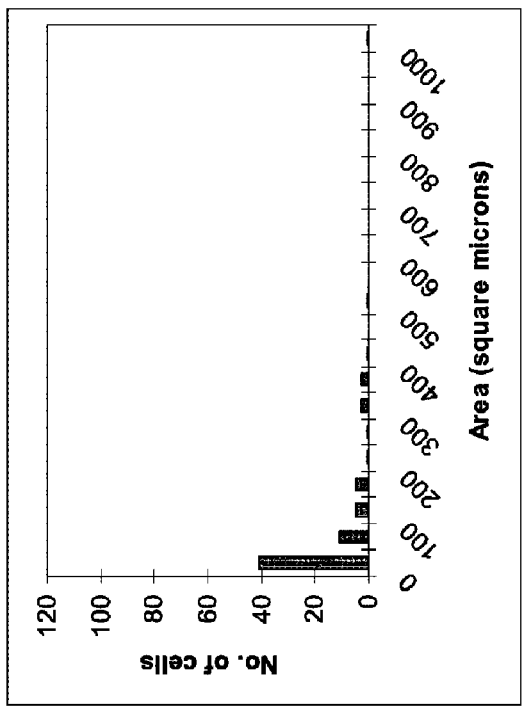
FIGS. 1A and 1B are representations of the number of air cells having the indicated area in dough which has not been subjected to exercising (1A) or from dough which has been subjected to exercising (1B).

The present invention will now be described in detail for specific preferred embodiments of the invention, it being understood that these embodiments are intended only as illustrative examples and the invention is not to be limited thereto.

Frozen Dough

The present invention relates to frozen dough that does not require thawing and proofing prior to baking. The dough of the invention includes flour, water, yeast, and/or chemical leavening agents, emulsifiers and one or more dough stabilizers to produce dough of such resilience that it can endure the necessary processing before freezing and acquire the desired rheological properties during baking.

The gluten content of the dough should be in the range of from 10 to 20 wt %, with higher gluten levels generally giving a dough with better gas-holding ability. For hard rolls, the gluten content is in the range of from 12-20%.

Typically, flour sold as "high gluten" generally contains about 12.5 to 15% gluten. However, it is to be understood that gluten levels can fluctuate from product to product or season to season. If desired, high-gluten flour can be used as the only flour in the dough, or it can be used with other flours.

Flours which can be used in the doughs of the present invention include, but are not limited to, wheat flour, potato flour and bread flour, or combinations and mixtures thereof.

The flour of the present invention may be enriched flour, i.e., flour that contains federally mandated amounts of flour, niacin, ferrous sulfate, riboflavin, enzyme, and thiamine mononitrate folate. Other types of flours may be substituted for the enriched flour or used in combination with enriched flour.

The dough of the present invention may comprise additional gluten or gluten hydrolysates. Gluten is known to contain gliadin and glutenin. Accordingly, these individual components or combinations thereof may be used instead of gluten. The gliadin may be alpha, beta, gamma or omega gliadin or combinations thereof.

The dough of the present invention may include flour from one or more grains (such as oats, corn, barley, wheat, rye and the like). The dough may include particulate materials from the grains (such as crushed wheat particles). Further, the dough may also include whole seeds or crushed seeds. Useful seeds are well known in the art and include sunflower seeds, caraway seeds, flax seeds, sesame seeds and the like. Thus, multigrain products can be prepared to improve the taste and/or to add nutritional value.

Sufficient water may be added to the present doughs to achieve the desired consistency. The precise amount of water depends on factors known to those skilled in the art, including the type of yeast used, the desired final product, and the amount and type of other ingredients. Water can be added in an amount of about 45 wt % to about 75 wt %, on flour weight basis.

The frozen dough of the present invention comprises one or more types of yeast. Yeast can be purchased and used in different forms. The driest commonly used yeast, sometimes referred to as "instant" yeast, contains 3.5-6.0% moisture. Cream yeast contains about 80-85% moisture; compressed yeast contains about 66-73% moisture; and active dry yeast contains about 6-8% moisture. Other examples include baker's yeast, protected active dry yeast, frozen yeast and the like. Generally, compressed yeast can be used. However, the invention is in no way limited to compressed yeast. For a given quantity of compressed yeast, one of ordinary skill in the art could easily determine the "compressed yeast equivalent," i.e., the quantity of another form of yeast having a different degree of hydration than compressed yeast, but containing the same amount of yeast as the given quantity of compressed yeast. For example, 1% compressed yeast is equivalent to about 1.5-1.8% cream yeast, which is equivalent to about 0.375-0.5% active dry, which is equivalent to about 0.3125-0.4% instant yeast.

Alternatively, or additionally, chemical leavening can also be used. Chemical leavening typically involves using leavening agents (such as sodium acid phosphate (SAPP) or sodium aluminum phosphate (SALP)) with baking soda or a combination thereof.

Gas nucleation sites may be formed in the dough or in a further embodiment, the gas nucleation sites may be introduced into the dough by any means. The bubbles in a gas nucleation site may be of any suitable gas or a combination of gases such as compressed air, $CO_2$, nitrogen and the like.

The dough of the present invention preferably comprises salt. Salt is generally added to promote better mixing, enhance flavoring, control moisture content within the dough, and/or to control yeast activity. Any commercially available fine-blending salt may be used.

The dough of the present invention also comprises an effective type and amount of a lipid source. In one embodiment, oil is used. In general, most edible oils are suitable, but vegetable oil is preferred due to its taste and lubrication properties, as well as its lack of trans fat. Examples of vegetable oils that may be used in accordance with the present invention, include, but are not limited to, soybean oil, cottonseed oil, peanut oil, canola oil, corn oil, olive oil and sunflower oil. Flavored oils may also be used in addition to or in place of the oil of the present invention. Non-limiting examples of flavored oils include olive, sesame, ginger and the like. In one embodiment, a fat or shortening that has a sharp melting point with high initial softening point is used.

Lipid sources may include emulsified oils. Examples of such emulsified oils are shortening, butter or margarine. Glyceride shortenings derived from animal or vegetable fats and oils including synthetically prepared shortenings are suitable for use herein. The glyceride may contain saturated or unsaturated long chain acyl radicals having from about 12 to about 22 carbon atoms generally obtained from edible oils and fats such as corn oil, cottonseed oil, soybean oil, coconut oil, rapeseed oil, peanut oil, olive oil, palm oil, palm kernel oil, sunflower seed oil, wall flower oil, lard, tallow and the like. Examples of preferred shortenings according to the present invention, include vegetable shortenings, soybean based shortenings or oils, hydrogenated soybean-based shortening or oil, corn oil, palm oil, hydrogenated palm oil, lard and tallow oils.

Hydrogenated shortening may be used if a slight crispiness to the outside of the cooked dough is desired. The hydrogenated shortening provides better crust definition, crispiness and better baked volume. Vegetable shortening that may be used in accordance with the present invention is preferably in the form of shortening flakes. Hydrogenated shortening is preferably used at a low concentration to minimize trans fat related issues.

The amount and type of fat source may be selected by those skilled in the art based on various factors including the ingredients of the frozen dough, and based on the desired taste and physical characteristics, such as maintaining a consistent internal structure.

The dough of the present invention comprises emulsifiers between 0.05% to 0.5% or higher as permissible under the FDA guidelines. Suitable emulsifiers include lecithin, hydroxylated lecithin; mono, di, or polyglycerides of fatty acids, such as stearin and palmitin mono and dyglycerides, polyoxyethylene ethers of fatty esters of polyhydric alcohols, such as the polyoxyethylene ethers of sorbitan distearate; fatty esters of polyhydric alcohols such as sorbitan monostearate; polyglycerol esters of mono and dyglycerides such as hexaglyceryl distearate; mono- and diesters of glycols such as propylene glycol monostearate, and propylene glycol monopalmitate, succinoylated monoglycerides; and the esters of carboxylic acids such as lactic, citric, and tartaric acids with the mono- and diglycerides of fatty acids such as glycerol lacto palmitate and glycerol lacto stearate, and calcium or sodium stearoyl lactylates (SSL) and all members of the sucrose ester family thereof, all varieties of diacetyltartaric esters of fatty acids, diacetyl tartaric acid ester of monoglyceride ("DATEMS"), and the like, and mixtures thereof.

The dough of the present invention includes one or more stabilizers which are typically hydrophilic colloids. These can be natural, i.e. vegetable, or synthetic gums and may be, for example, carrageenan, guar gum, locust bean gum, alginate, xanthan gum and the like or semi-synthetic such as methylcellulose, carboxy-methylcellulose, ethylcellulose, hydroxy-propylmethylcellulose (METHOCEL F-50 HG), and microcrystalline cellulose. Typically, a gum or combination of gums is employed with a sugar, e.g., dextrose carrier. The amount of these stabilizers for this product is between 0.2 to 1.6% or higher, as permissible under FDA guidelines.

The dough of the present invention may also include flavoring and/or coloring agents. The dough may optionally contain suitable amounts of, for example 0.01 to 0.5%, flavoring agents and/or coloring agents. When using flavorings, the amount of water and salt used in the dough may have to be adjusted to take into account, for example, the amount of salt and water already contained in the flavoring. It is believed that "fine tuning" of the amount of salt and water in the dough would be within the ability of one of ordinary skill in the art. An example of a suitable flavoring is butter flavor and fermented flavor. It will be appreciated by those skilled in the art that many different individual flavors can be used to achieve the ultimate desired flavor.

Vitamin and minerals may also be added to the dough as desired. Riboflavin is a commonly added vitamin to the dough. Vitamins and minerals may be added as enriched flour or added individually. In addition, calcium in absorbable or elemental form may also be added.

Sweeteners may be added to the present dough to provide for texture and/or flavor. Sweeteners such as sugars may be added for the additional purpose of providing a source of energy for the yeast. In one embodiment, dextrose and/or other sugars such as sucrose, crystalline fructose, high fructose corn syrup (HFCS) or a combination of these sugars may be used. Alternatively or additionally artificial sweeteners such as aspartame, saccharine, sucralose, alitame, cyclamate and the like may also be used.

If desired, the dough of the present invention may contain oxidants such as azodicarbonamide, potassium iodate and the like.

The ingredients of the present invention may be included as a combination. For example, a dough conditioner combination comprising one or more of the following may be used: oxidants, enzymes, emulsifiers, stabilizers, flour and oil. A non-limiting example of such a conditioner is Tolerance Plus. The dough conditioner may also contain ascorbic acid (Tolerance Plus with AA). Other dough conditioners include Panodan, potassium bromate ingredient (PBRI) and azo dicarbon amide (ADA). Dough conditioners can be used in a wide range of weight percents, as long as their presence and amount does not cause the specific volume of the baked product to be less than 4 cc/gm. An acceptable range for most conditioners is in the range of from 0.3 to 2 flour wt %.

If desired, the dough of the present invention may also comprise enzymes. The enzymes may be selected from a group including, but not limited to, amylase, hemicellulase, glucose oxidase, xylanase and the like. Determination of the amount and type of enzyme is well within the purview of those skilled in the art. Use of enzymes, such as amylases may be advantageous in that they may retard staling of the frozen dough or the resulting rolls, breads and the like. Enzymes may also result in an increased strength, improved extensiblity or elasticity, stability and reduced stickiness of the dough, thus resulting in improved machinability during manufacture. The effect on the dough may be particularly advantageous when a lower content gluten flour is used. The improved machinability is of particular importance in connection with dough which is to be processed industrially. The amount and type of enzyme of the present invention may be determined by those skilled in the art depending on the specific desired resulting properties.

The dough of the present invention may include reducing agents, particularly for more flow in the oven. Suitable reducing agents include, but are not limited to, L-cysteine and glutathione. It is believed that the reducing agents contribute to the high gluten dough becoming more malleable.

After addition of all or some of the ingredients, dough mixing is performed. Preferably, the dough is shaped into a desired shape such as, a square, other polygons, or round, or rolled into rolls. For example, flat dough pieces are rolled out for pizza.

Preparation of Dough

In the first step, the ingredients of the dough are combined together. The combining step may include either combining all of the ingredients at once or combining different combinations of ingredients first and then combining all of the ingredients together. For example, according to one embodiment, certain ingredients are combined to form a pre-mix, including for example, the salt, stabilizers and sugar. Then, the pre-mix is combined with the remaining ingredients including the flour, yeast, water and lipid source. The pre-mix and/or the final mixture may include one or more additional ingredients as set forth herein.

According to a preferred embodiment of the present invention, the combining step includes mixing all the ingredients. The ingredients may be mixed with one another by mixing methods generally known in the art.

After combining the ingredients, they are then mixed (or further mixed if mixing steps have already taken place) by any suitable mixing apparatus, such as a Hobart mixer. By way of example only, the ingredients are mixed for about 1 to about 4 minutes on a first speed (low) and then for about 7 to about 20 minutes on a second speed (high), which is faster than the first speed. Preferably, the ingredients are mixed for about 2 minutes on low speed and for about 8-12 minutes on high speed.

The dough is then divided into small pieces and may be panned. After preparation of the dough, the dough is held in "ambient conditions" for 1-60 minutes. This step is termed herein as resting. In one embodiment, the dough may be held at higher than ambient humidity and temperature. In a preferred embodiment, the dough is held for 5-40 minutes more preferably for 10-15 minutes at ambient humidity and temperature. While not intending to be bound by any particular theory, it is considered that during this step, which is termed herein as pre-proofing, relaxation of internal stresses in a dough piece takes place, and the fermentation process partly takes place leading to formation of gas nucleation sites (bubbles) in the dough matrix. Indicated time (pre-proofing time) from 1 to 60 minutes is selected depending upon the type of the product to be baked, humidity and temperature of proofing and type and quantity of yeast used in the formulation.

After resting, the dough pieces are exercised. "Exercising" the dough as used herein refers to subjecting the dough to mechanical stresses so as to restructure the dough matrix. Such restructuring may involve reducing the number of air cells and/or shifting the air cells size distribution toward larger air cells. In one embodiment, the dough can be exercised by subjecting the dough to alternating high and low pressure such that the pressure differential between the high (a first pressure) and the low pressure (a second pressure) is between 1 to 20 inches of Hg. In various embodiments, the pressure differential between the first and the second pressure can be 1, 2, 3, 4, 5, 6, 7, 8, 9, 10, 11, 12, 13, 14, 15, 16, 17, 18, 19 or 20 inches of Hg. In one preferred embodiment, it is 10-15 inches of Hg. In another embodiment, it is about 10 inches of Hg. In one embodiment, the pressure differential can be achieved by alternating cycles of negative and positive pressure. In this process, cyclic decrease and increase of pressure are practiced, and pressure can be varied by any means such as but not limited to mechanical pressure, vacuum pressure, gravitational force, etc. The change in pressure can be effected at different rates. For example, a 5 minute pressure cycle can be used. The starting point for the pressure cycles can be below the atmospheric pressure (i.e. vacuum) or at atmospheric pressure (about 30 inches of Hg) or above atmospheric pressure (i.e., above 30 inches of Hg). The duration of each cycle and the pressure (i.e. increasing or decreasing with subsequent cycle) is determined by the value of pressure and by the time, which is necessary for the required increase in the volume of dough piece. For a 4 ounce roll, in one embodiment, a pressure differential of 15 inches is used. For larger rolls (7 to 10 oz) a greater pressure differential of 10-20 inches of Hg may be needed.

At least one cycle of alternating high and low pressure is needed. A preferred range is 1 to 10 cycles. Depending upon the type of bread product, the number of indicated pressure cycles could take any value within the range from 1 to 10 (for example, with French bread rolls it is preferable to have from 3 to 5 cycles). It is believed that excessive cycling will damage the dough such as give it a wrinkled surface. Optimization of pressure differential and number of cycles can be done by routine experimentation. The rate of the pressure change can be varied. Generally a slower rate is better for preserving the integrity of the dough. In one embodiment, the dough is subjected to a pressure differential of between 5 and 20 inches over a period of 1-200 seconds. In a preferred embodiment, the dough is subjected to a pressure differential of between 10-15 inches of Hg over a period of 10-30 seconds. In a different embodiment, for a 1.5 ounce roll, a half cycle is from 10-20 seconds, while a full cycle is from 20-40 seconds and for a 4.0 ounces roll, a half cycle can be 20-30 seconds. Larger amounts of dough may require up to one minute for a full cycle. During the higher pressure cycles, the time that the dough is held at the lower pressure is defined here as the lag time. While no lag time is needed for this invention, the lag time can be varied from 0 to 5 minutes. Lag time may be useful for larger dough (4 ounces or more) to enable the core to be subjected to adequate pressure differential. Alternatively or additionally a slower rate of pressure change will also enable the core to be subject to an adequate pressure differential.

Pressure differential can be applied to the dough by placing the dough in a container and providing ambient, positive or negative pressure in the container. The creation of negative pressure is typically done by creating the desired level of vacuum and positive pressure can be created by infusing gas such as air into the container Values of pressure, character and rate of its variation, degree of increase in the volume of dough piece could also be different with different cycles depending upon the type of final product to be baked. The volume after the pressure cycling (exercising) is about 2 to 2.2 times. Depending upon the type of baked product, the increase in volume of the final baked product could amount to 3 to 5 times (for example, for French bread rolls the weight of which is 1.5 oz, the required increase in volume constitutes 3.5 times). For example, for a 1.5 oz or a 4 oz roll, the raw dough volume is typically 0.9 to 1.1; the frozen specific volume (i.e., after exercising the dough and freezing) is 2.0 to 2.2 and the final specific volume after baking is 4.5 to 5.7. Thus, a high final specific volume is achieved in the present invention even though the specific volume after freezing is 2.2 or less (typically about 2). It is believed that exercising the dough enables the restructuring of the dough matrix and creation of air cells such that a high specific volume can be achieved after baking.

In one experiment it was observed that for 1.5-oz product, dimensions of the dough after various stages of processing were as follows (the measurements indicated in inches): after rounding: height: 1.08, diameter: 1.91; after resting: height: 1.38, diameter: 2.38; after exercising: height: 1.47, diameter: 2.63 and after overspray and freezing: height: 1.63 and diameter: 2.71.

In typical pre-proofing steps, the specific volume is known to be up to 3.5. An advantage of the exercising step in this invention is that it is not necessary to have a high frozen specific volume to achieve a final baked specific volume of at least 4 (or in one embodiment, at least 5). Thus, it was observed that in the present invention, the specific volume of the frozen dough is 2.2 or less, preferably 2 or less. The reduced frozen dough volume (compared to typical pre-proofing step) requires less storage space than the typical pre-proofed frozen dough and also results in the frozen dough being storable for a longer period of time than the typical pre-proofed dough. Yet the frozen dough of the present invention can be directly transferred from the freezer to the oven and achieves a similar specific volume as the typical pre-proofed dough.

While not intending to be bound by any particular theory, it is believed that exercising the dough, at least in part, contributes to these properties of the frozen dough. Further, it has been observed that exercising the dough results in an increase in the number of larger size cells and a decrease in the number of total air cells. There was no significant difference in the degree of roundness of the cells.

At the end of the process, the dough is brought back to the atmospheric pressure. Following this, overspray is used on the dough. It is believed that an overspray prevents the gelatinization of the surface due to exposure to excessive temperature during baking. If a dough piece is heated in the oven so that the core will reach an adequate temperature, the surface often becomes dry. In these situations, it is beneficial to use an overspray. It is preferable to use an overspray comprising a high melting point fat, which may be trans fat free. Suitable fats for use in overspray will have a softening point between 90° F. and 130° F. Examples of suitable fats for overspray includes canola oil, hydrogenated cotton seed oil, partially hydrogenated soy oil, partially hydrogenated corn oil, soy oil, butter, and anhydrous milk fat. In one embodiment, formulations comprising the above fats such as Coffee Rich like emulsions and PAM can be used. The hydrogenated oils have citric acid as a preservative. An advantage of using a high melting point overspray is that toppings can be mixed with the overspray melts, the toppings will get affixed to the dough. As a result, the loss of toppings, which is generally significant during manufacture and/or storage, is reduced. In general the range of overspray is 0.1 to 1 g per 1.5-oz roll. In one embodiment, the preferred range is 0.3 to 0.6 g for 1.5-oz roll (the roll typically has a diameter of 7 cm, corresponding to a total surface area of 65 sq cm not touching the bottom.)

The dough is then frozen by methods known in the art. When freezing the dough, a uniform cooling rate throughout the dough is desirable. A convenient method for freezing the shaped dough is by using spiral freezer (−30° F. to −62° F.). Carbon dioxide or nitrogen optionally may be used for gradual freezing (0° F. to −10° F.). It was observed that changing the core temperature between 5° F. and −10° F. did not significantly affect the baked specific volume. Further, blast freezing also did not significantly affect the baked specific volume of the final product. Blast frozen doughs over 10, 20 and 30 minute periods were all observed to have a baked specific volume of 4.6-4.7 ml/g.

For prolonged stability, the frozen dough is preferably stored at a temperature in a range of from about −42° F. to about −10° F., more preferably at a temperature in the range of from about −20° F. to about −12° F. In the frozen state the dough pieces (which represent a semi-finished bakery product) are stored for a desired period of time Optionally, the shaped dough is topped with at least one topping and/or flavoring prior to freezing the dough. Non-limiting examples of suitable toppings and flavorings that may be used in accordance with these methods, are as set forth above.

The process of the present method results in the production of a semi-finished bakery product (i.e. frozen dough) with a specific volume in the range of 1.5 to 2.2 cc/g This product is ready for baking without additional time consumption on thawing and proofing, ideally semi-finished products, which are ready for baking directly after they are removed from the freezing chamber. In this case a baked product is characterized by organoleptic characteristics that are typical of freshly-baked bread and a specific volume of at least 4.0 cc/g. In some embodiments, the specific volume of the baked products was at least 5.0 cc/g.

In the method of making the dough, scores could be made on the surface of a dough piece. Scoring can be done prior to freezing, or after blast freezing. If done prior to freezing, it can be done both prior to subjecting the dough piece to the pressure differential cycles, at any stage during the cycles, or after the exercising step prior to freezing. It is convenient to do it for the final products, in case the crust is sufficiently quickly formed during the process of baking, while the process of rising of a product being baked still goes on. Surface scores prevent the rupture of the formed crust, providing for the required external appearance of the finished bread. If the indicated scores were not made during the production of frozen dough, they could be made directly prior to bread baking. The scores are typically 3 to 4 mm deep.

In one embodiment, combinations of exercising, scoring and overspray can be used. Exercising was observed to be particularly advantageous when used with a surface treatment such as scoring. Products that are typically scored include Bolillo, French bread, Italian bread, Hoagie, Sub rolls and Dinner rolls. In another embodiment, exercising can be combined with overspray. In yet another embodiment, exercising can be combined with scoring and overspray with or without pre-topping.

Method of Baking

The frozen dough of the present invention can be baked in a conventional oven, such as a rack oven. In one embodiment, baking is carried out in an oven that combines different modes of heating. For example, an oven can be used which can thaw, increase the volume to provide a high baked specific volume, and bake a product with desirable crust in substantially reduced time. Thus, baking could be carried out according to any known method (for example, by convective heating, using microwave, infrared or radio-wave radiation, using electro-contact method or other appropriate methods or combination of these methods). It is also possible to use reduced or increased pressure during the baking process, concurrent treatment with vapor or ultrasound is also possible. Besides, joint or successive use of the said actions in any combination is possible. For example, it is possible to conduct the process of baking at reduced pressure alternating microwave and convective methods of heating.

The frozen dough of the present invention can be stored at 0°-5° F. for at least 3 months. The present invention does not require the use of freezing point depressants.

Example 1

This example provides ranges of components for a French bread dough.

| Ingredient | Range (% of flour) | One Embodiment |
| --- | --- | --- |
| High gluten flour | 100 | 100 |
| Gluten | 0-6 | 4 |
| Compressed yeast | 7-14 | 9 |
| High fructose corn syrup | 1-6 | 5 |
| Dextrose | 0-2 | 0.5 |
| PBRI | 0.01-0.07 | 0.05 |
| SSL | 0.1-0.5 | 0.5 |
| ADA | 0.005-0.03 | 0.01 |
| Tolerance Plus with AA | 0.1-1.0 | 0.5 |
| Guar gum | 0.1-0.8 | 0.5 |
| Panodan | 0.1-0.8 | 0.4 |
| Soybean oil | 0.5-2.0 | 1.5 |
| Salt | 0.5-4.0 | 1.5 |
| Water | 55-75 | 60 |

All ingredients were mixed together using a Hobart mixer (Urban Raiff & Sons, Inc., Buffalo, N.Y.). The dough was divided and rounded into balls. Individual dough portions were then pre-proofed in a proofer. The pre-proofed rolls were then subjected to vacuum pressure cycles. For each pressure cycle, the rolls were increased to the volume of 3.5 times the original volume, with a maximum pressure of 17 in of Hg, and then revert to the atmospheric pressure. After 3 cycles of pressure changes, the dough was frozen using a blast freezer, and then stored at −20° C. for at least 24 hours. For using the product, frozen rolls were directly placed in a rack oven at 375° F. for 13 min. This resulted in a desirable baked product with golden brown color, good crust and crumb structure, and flavor typical of freshly baked French bread roll. The specific volume of the roll was about 4.8 cc/g.

Example 2

The number of air cells were determined for both a 1.5 oz dinner roll made of dough that was exercised and a dinner roll made of dough that was not exercised. Exercising was carried out by subjecting the dough to a 10 inches pressure differential starting at ambient pressure for 3 cycles with each half cycle lasting about 10-12 seconds. A center-cross section of a vacuum-exercised, pre-proofed, frozen dough was cut using a sharp knife. The cut cross-section of the frozen dough was examined under a stereomicroscope at a magnification of 400×. Caution was taken to keep the sample from thawing by means of cold ambient temperature environment. Pictures of three random circular spots (1 centimeter in diameter each) on the cut cross-section of the frozen dough were taken using a high magnification digital camera. The pictures were transferred to an imaging software (Paxit). The air cells were manually marked and characterized for the area and roundness using the software. Results were then presented in the form of a histogram. This procedure was repeated for dough with similar unit operations except that vacuum-exercising was not performed.

Figure 1B:
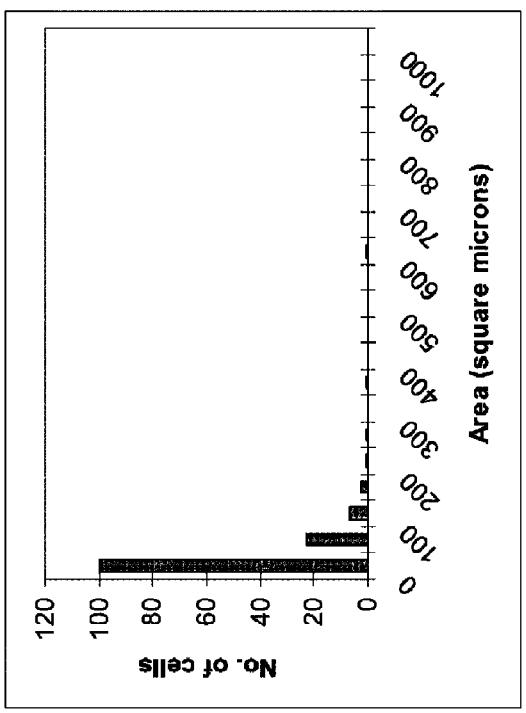
Figure 2B:
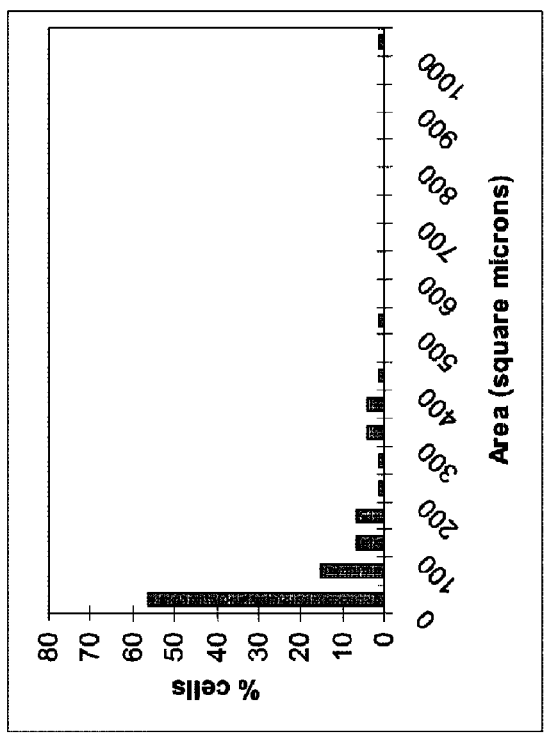
FIGS. 2A and 2B are representations of the air cells from FIG. 1 expressed as percent of total air cells as a function of air cell area in dough which has not been subjected to exercising (2A) or from dough which has been subjected to exercising (2B).
Figure 2A:
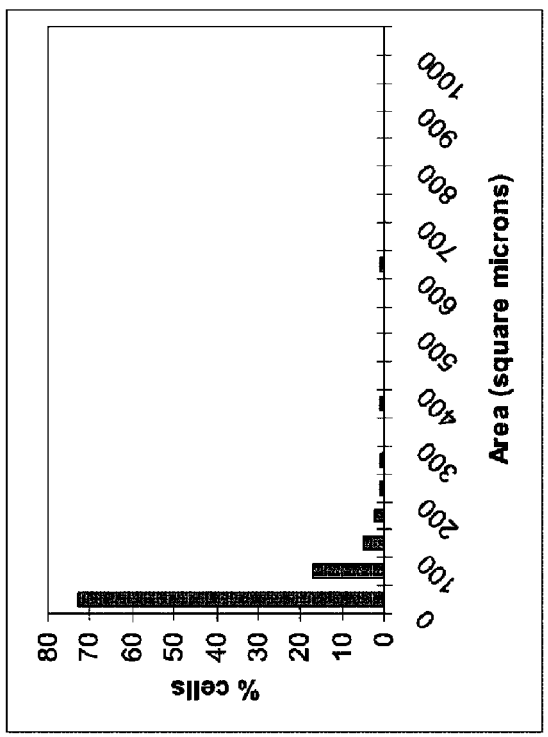

The results of the experiment (FIGS. 1A, 1B, 2A and 2B) show that with exercising, a higher number of larger air cells are observed. For a dinner roll, the total number of air cells without exercising was 137 while the total number of air cells for the dinner roll with exercising was 73. Therefore, it is considered that the reduction in the number of air cells is due to coalescing of the smaller cells into larger cells. In addition, the bar graphs for the size of the air cells indicates that larger cells were observed compared to if the dough was not subjected to exercise. No significant difference was observed in the degree of roundness of the cells.

Example 3

The baked product of the present invention was subjected to comparative sensory testing for Chewiness and Flavor. The baked product of the present invention was tested and compared to a comparative example. The composition of the doughs were as described in the embodiment in Table 1. However, the processing of the two doughs was different. The dough of the present invention was pre-proofed for 15 minutes at 95° F. and 95% RH and was exercised as described in Example 2 prior to freezing, while the dough of the comparative example was not pre-proofed, nor exercised prior to freezing. After freezing, the dough of the present invention was immediately placed in an oven to bake. The dough of the comparative example was thawed overnight, followed by one hour of floor time and then baked in an oven. The average score on the Hedonic scale (1 to 9 points) as tested by 50 panelists were as follows:

| | Present Invention | Comparative Example |
| --- | --- | --- |
| Overall liking - (texture, appearance, flavor) | 6.22 | 5.68 |
| Overall Flavor | 6.34 | 6.0 |
| Chewiness | 6.42 | 5.98 |

The chewiness score is considered to be an indicator of higher dough elasticity. It is believed that higher dough elasticity results from exercising the dough.

The invention claimed is:

1. A method of producing a frozen dough which can be transferred directly from freezer to oven without a proofing or thawing step comprising:
   (a) preparing dough by mixing flour having a gluten content in the range of 10-20%, a lipid source, water, emulsifiers in the amount of 0.05-0.5%, leavening means and stabilizers;
   (b) forming gas nucleation sites in the dough;
   (c) exercising the dough by subjecting it to alternating first and second gas pressures, wherein if the first pressure is greater than atmospheric pressure, the second pressure is lower than atmospheric pressure and if the first pressure is lower than atmospheric pressure, the second pressure is greater than atmospheric pressure, wherein the pressure differential between the first and the second pressure is in the range of 1 and 20 inches of Hg;
   (d) allowing the dough to return to atmospheric pressure; and
   (e) freezing the dough,
   wherein the frozen specific volume of the frozen dough is less than 2.2 cc/g and wherein the frozen dough can be directly transferred to an oven producing a baked specific volume of at least 4 cc/g.

2. The method of claim 1 wherein the step of forming gas nucleation sites is performed by resting the dough.

3. The method of claim 1, wherein the pressure differential between the first pressure and the second pressure is in the range of 10-15 inches of Hg.

4. The method of claim 3, wherein the duration of each half cycle is 10-30 seconds.

5. The method of claim 3, wherein the exercising step is performed for 3-5 cycles of pressure differential.

6. The method of claim 2, wherein the dough is rested at ambient temperature and humidity for 5-40 minutes prior to exercising.

7. The method of claim 2, wherein the dough is rested at ambient temperature and humidity for 10-15 minutes prior to exercising.

8. The method of claim 1 further comprising a step for scoring the dough prior to the step of freezing the dough or after the step of freezing.

9. The method of claim 1, wherein the leavening means is yeast or chemical leavening agents or a combination thereof.

10. The method of claim 9, wherein the yeast is present in the range of about 8-12%.

11. The method of claim 2, wherein the chemical leavening agent is sodium acid phosphate or sodium aluminum phosphate with baking soda.

12. The method of claim 2, wherein the lipid source is an emulsified oil, a vegetable oil or a flavored oil.

13. The method of claim 2, wherein the stabilizers are hydrocolloids comprising natural or synthetic gums in the amount of between 0.2 to 1.6%.

14. The method of claim 2, wherein the dough further comprises one or more of the following: flavoring agents and/or coloring agents, sweeteners or artificial sweeteners, oxidants and/or reducing agents, and enzymes.

15. The method of claim 1, further comprising the step of overspraying the dough with a fat composition having a softening point between 90°-130° F. prior to freezing.

16. A frozen dough prepared by the method of claim 1.

17. A method of producing a baked product from a frozen dough comprising:
  (a) preparing dough by mixing flour having a gluten content in the range of 10-20%, a lipid source, water, emulsifiers, stabilizers, and leavening means;
  (b) forming gas nucleation sites in the dough;
  (c) exercising the dough by subjecting it to alternating first and second gas pressures, wherein if the first pressure is greater than atmospheric pressure, the second pressure is lower than atmospheric pressure and if the first pressure is lower than atmospheric pressure, the second pressure is greater than atmospheric pressure, wherein the pressure differential between the first and the second pressure is in the range of 1 and 20 inches of Hg;
  (d) freezing the dough, wherein the specific volume of the frozen dough is less than 2.2 cc/g, and
  (e) transferring the frozen dough directly to an oven for baking
  wherein the specific volume of the baked product is at least 4 cc/g.

18. The method of claim 17, wherein the specific volume of the frozen dough is less than 2 cc/g and the specific volume of the baked product is at least 5 cc/g.

* * * * *